United States Patent [19]

Possati

[11] 4,437,239
[45] Mar. 20, 1984

[54] GAUGE FOR THE DIMENSIONAL CHECKING OF A MECHANICAL PIECE

[75] Inventor: Mario Possati, Bologna, Italy

[73] Assignee: Finike Italiana Marposs S.p.A., S. Marino di Bentivoglio, Italy

[21] Appl. No.: 333,935

[22] Filed: Dec. 23, 1981

[30] Foreign Application Priority Data

Dec. 23, 1980 [IT] Italy .................................. 3599 A/80

[51] Int. Cl.³ .............................................. G01B 7/12
[52] U.S. Cl. ................... 33/143 L; 33/149 J; 33/178 E; 33/174 Q
[58] Field of Search ............ 33/178 R, 178 E, 143 R, 33/143 L, 148 R, 148 H, 149 R, 149 J, 181 AT, 174 Q

[56] References Cited

U.S. PATENT DOCUMENTS

| 1,461,083 | 7/1923 | Damerell | 33/181 AT |
| 3,166,852 | 1/1965 | Whitney | 33/174 L |
| 3,345,753 | 10/1967 | Giardino | 33/172 B |
| 3,688,411 | 9/1972 | Asano et al. | 33/143 L |

FOREIGN PATENT DOCUMENTS 485302 12/1975 U.S.S.R. ........................... 33/178 R

Primary Examiner—Willis Little
Attorney, Agent, or Firm—Stevens, Davis, Miller & Mosher

[57] ABSTRACT

Gauge for the dimensional checking of a piece being machined, comprising a movable gauging arm fixed to an outer casing, through a pin and a bushing. A spring coupled to the arm and to the outer casing acts on the pin and the bushing for univocally defining an axis, stationary with respect to the casing, for the rotation of the gauging arm.

14 Claims, 3 Drawing Figures

GAUGE FOR THE DIMENSIONAL CHECKING OF A MECHANICAL PIECE

The present invention relates to a gauge for the dimensional checking of a mechanical piece, with a support, a gauging arm movable with respect to the support, a feeler element, connected to the arm to touch the piece to be checked, connecting means having a first element fixed to the arm and a second element fixed to the support, the first and the second elements allowing limited—substantially rotatory—gauging displacements of the arm with respect to the support, and detection means associated with the arm and the support.

A gauge is already known for the dimensional checking of a piece, wherein a movable gauging arm, carrying a feeler element adapted to touch the piece, is connected to a support by means of flat springs lying according to two perpendicular planes the intersection of which defines an axis, that is substantially stationary with respect to the support, for the rotation of the arm with respect to the support.

This gauge is accurate because the axis of rotation of the movable arm is defined by the flat springs with great accuracy and moreover because there are no frictions.

Owing to the fragility of the springs this gauge may be unfit for checking pieces during machining, especially in those applications including devices for a rapid approach and retraction of the gauge with respect to the piece, and in which, consequently, the gauge is subject to strong mechanical stresses.

In other known gauges a movable gauging arm is coupled to a support by means of a cylindrical hinge including a cylindrical pin and bushing. This type of coupling is very rugged but presents some drawbacks.

The matching of a cylindrical pin with a cylindrical bushing does not define in an univocal way the position of the axis of rotation of the pin with respect to the bushing. This axis lies, as already known, within the space defined by a cylindrical surface whose circle base diameter is the same as the matching tolerance existing between the pin and the bushing and whose longitudinal geometrical axis coincides with the geometrical axis of the bushing.

The indetermination of the axis of rotation of the movable arm of a gauge is the cause of measurement repeatability errors. In order to limit these errors the known gauges are constructed so as to have a small radial play between pin and bushing; but this matching method involves an extremely accurate and consequently expensive machining of the two pieces.

A drawback arising from the matching of a cylindrical pin and bushing is the wear caused by their mutual sliding. Wear enlarges the space in which there lies the axis of rotation and consequently it accentuates the gauge repeatability errors.

A further drawback arising from the matching of a cylindrical pin and bushing is the possible seizure of the two matched pieces, e.g. owing to dust or dirt. The possibility of seizure increases the more there is less radial play between pin and bushing.

The object of the present invention is to provide a gauge wherein the means that connect the arm to the support ensure a very strong mechanical connection and also define in an univocal way a fulcrum, that is stationary with respect to the support, to enable the arm rotation.

This object is attained through a gauge of the type outlined at the beginning of the description wherein the connection means include resilient means coupled to the arm and the support for maintaining in firm contact the first and the second elements, in order to define a geometrical axis of rotation for the arm, that is stationary with respect to the support.

The invention is now described with reference to the accompanying drawings, given by way of non-limiting example, in which.

Figure 1:
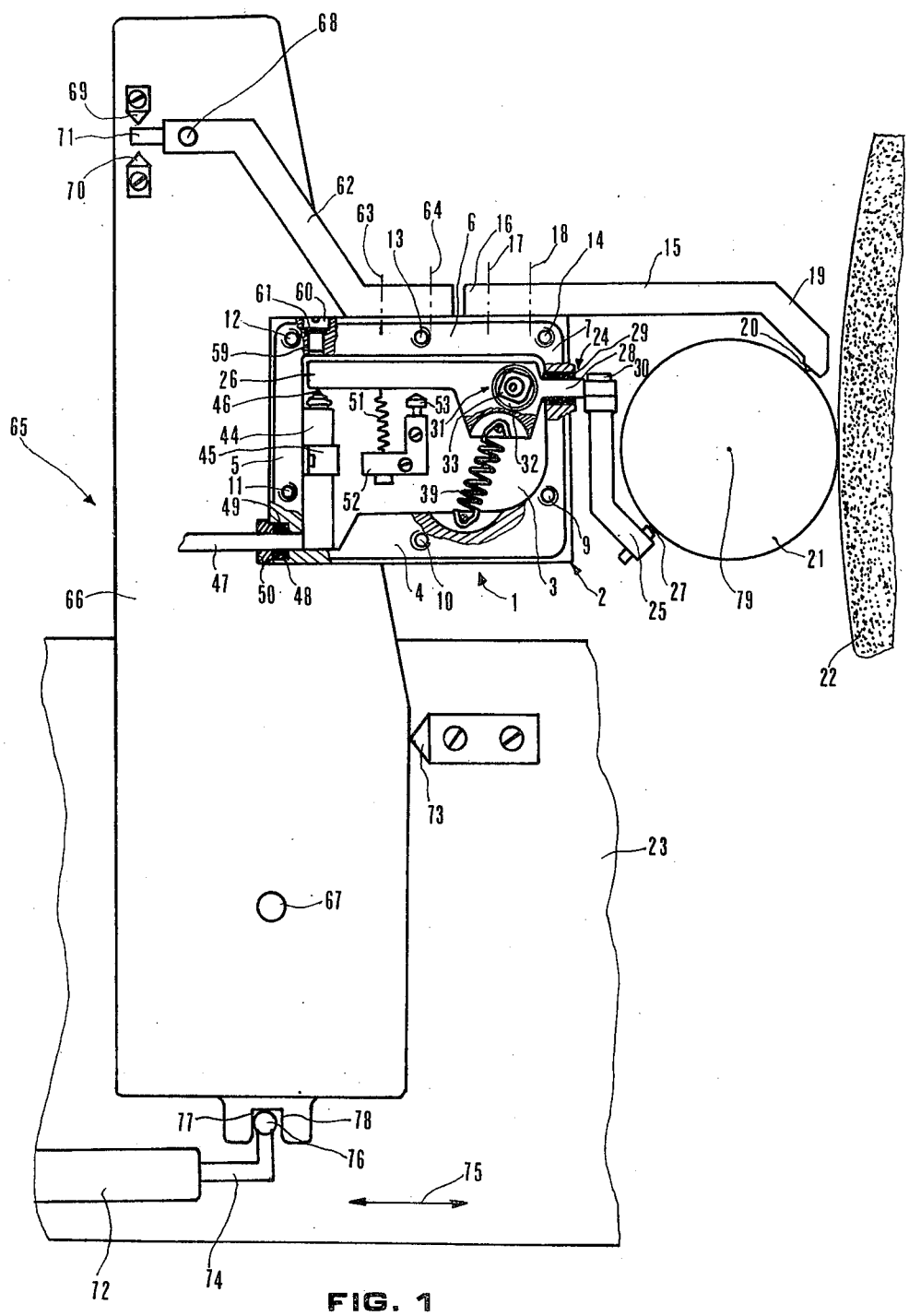
FIG. 1 is a side view partly in cross-section of a gauging device according to a preferred embodiment; the device including a gauge with a casing from which there has been removed a lateral closure cover, and connection means for connecting the gauge to a grinding machine for machining external surfaces.
Figure 2:
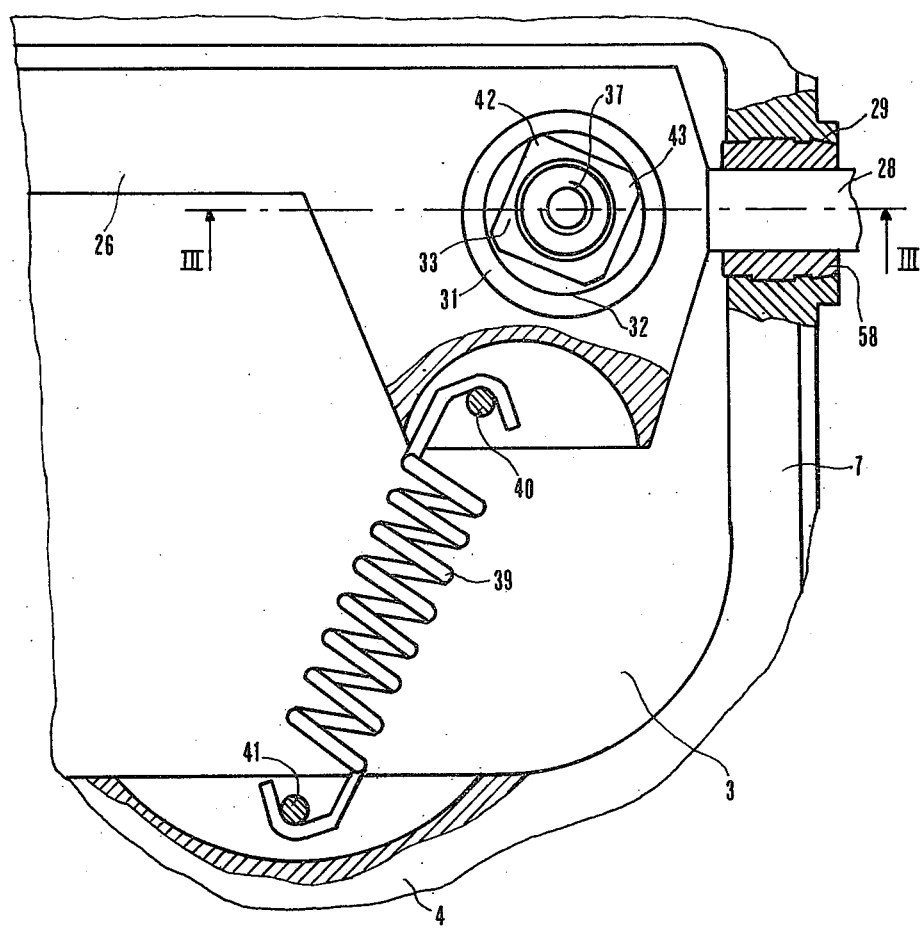
FIG. 2 is a simplified and enlarged-scale view of a detail of the gauge shown in FIG. 1.
Figure 3:
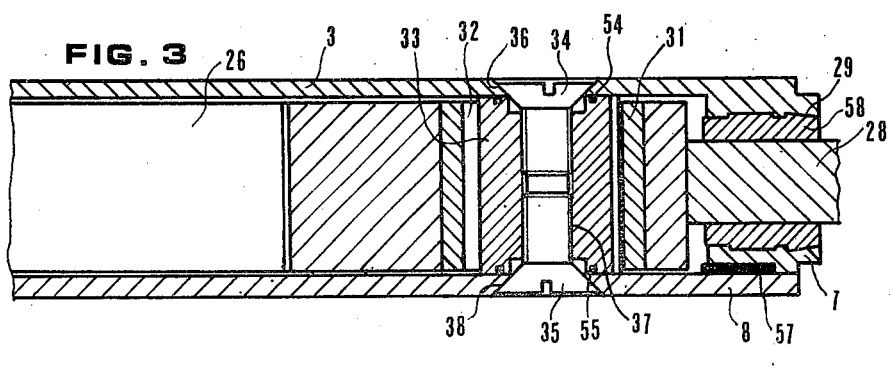
FIG. 3 is a sectional view taken along line III, III of the detail shown in FIG. 2 wherein there is also shown the lateral closure cover of the gauge casing.

With reference to FIGS. 1 and 2, a gauge 1 has an outer support casing 2 with vertical wall 3 having a rectangular perimeter, four lateral walls 4–7 perpendicular to wall 3 and a removable cover 8—shown in FIG. 3—, that seals an opening opposite to vertical wall 3. Cover 8 is fixed to walls 4–7 by means of screws, not shown, screwed in holes 9–14 in the walls; thus, cover 8 can be considered as part of casing 2.

An arm 15 has an end 16 fixed to wall 6, externally positioned with respect to casing 2, by means of screws whose geometrical axes 17 and 18 are shown in FIG. 1.

The other end 19 of arm 15 carries a feeler 20 that touches a first point of the surface of a piece 21 to be checked.

For example, piece 21 could be a crankshaft main bearing or pin bearing whose diameter needs to be checked in the course of a grinding operation. The grinding machine bed 23 and grinding wheel 22 are partially shown in FIG. 1.

The crankshaft 21 is positioned with respect to bed 23 in a known way, e.g. held by two centers—not shown in the drawings.

Furthermore crankshaft piece 21 is rotated about an axis 79—that is stationary with respect to bed 23—by means of driving means already known and consequently not shown.

Gauge 1 has a second arm 24, movable with respect to support casing 2 and including a section 25 that is externally positioned with respect to support casing 2 and a section 26 that is substantially internally positioned with respect to support casing 2. A feeler 27 is fixed to an end of section 25 and touches the surface of piece 21 at a point that is diametrically opposite to that touched by feeler 20. Section 26 has a stem 28 passing through an opening 29 of wall 7 and defines at one end a hole for the passage of a screw 30 for connecting section 25 to section 26. Section 26 also defines a transverse hole in which there is locked, by interference fit, a first connection element consisting of a bushing 31 defining a cylindrical hole 32 that is transverse to the longitudinal direction of section 26.

A second connection element, consisting of a substantially prismatic pin 33 passes lengthwise through hole 32 of bushing 31, with some radial play, and is locked to casing 2—see FIG. 2—by means of screws 34 and 35. Screw 34 has its stem passing through a hole 36 of wall 3 and is threadedly coupled to one end of a through hole 37 of pin 33. Screw 35 has its stem passing through a hole 38 of cover 8 and is threadedly coupled to a second end of hole 37. The cross-section of pin 33 have a substantially square perimeter and chamfered edges.

Resilient means consisting of a helical spring 39 has an end coupled to a pin 40 fixed to section 26 of arm 24 and the other end coupled to a pin 41 fixed to wall 4 of casing 2. Spring 39 applied a force to arm 24 that urges, as shown in FIG. 2, the surface of hole 32 against two adjacent edges 42 and 43 of pin 33. The contact of edges 42 and 43 with the surface of hole 32 occurs along two generating lines of the hole surface adjacent to the aforementioned edges. Spring 39 is resilient and thus allows limited rotations of arm 24, with respect to casing 2, about a geometrical axis—that is stationary with respect to casing 2—defined by the contact of pin 33 with the surface of hole 32. This axis is the intersection of two planes which pass, instant after instant, along the two generating lines of hole 32 touched by edges 42 and 43 and are perpendicular to the surface of hole 32. Obviously this axis is the longitudinal geometrical axis of hole 32.

Moreover, the amplitude of the radial play existing between pin 33 and hole 32, does not affect the definition of the axis of rotation of arm 24; therefore gauge 1 is very accurate.

When the diameter of piece 21 reaches the nominal value, the straight line of action of the force generated by spring 39 is incident to the longitudinal geometrical axis of hole 32. The line of action of spring 39, moreover, lies in a plane that is perpendicular to the longitudinal geometrical axis of hole 32 and passes through the points where feelers 20 and 27 touch the surface of piece 21.

Detection means consisting of a gauging head 44 of the "pencil" or "cartridge" type, including a position transducer of the inductive type, are coupled to wall 5 of casing 2 by means of a clamp 45.

Head 44 has a movable feeler 46 that is pushed by a spring—not shown in the drawing—located inside head 44 and can so touch the end of section 26 opposite to stem 28. Head 44 is connected to a power supply, processing and display unit, not shown, by means of a cable 47 coming out of casing 2 through a hole 48 made in wall 5. A gasket 49, that is resiliently flexible and placed between cable 47 and hole 48, and a ring nut 50, that is threadedly coupled to an end of hole 48 and clamps gasket 49, seal hole 48.

A helical spring 51 has a first end coupled to a block 52 fixed to wall 3 and a second end coupled to section 26. Spring 51 urges section 26 of arm 24 to push feeler 27 against the surface of piece 21.

A limit stop 53, connected in an adjustable way to block 52, limits the amplitude of the counterclockwise rotation of arm 4 thus preventing any damage from occurring to gauging head 44.

The clockwise rotation of arm 24 is limited by the contacting of section 26 with the surface of wall 6 adjacent to it.

Annular gaskets 54 and 55—shown in FIG. 3—are housed in relevant grooves of pin 33, so sealing pin 33 to wall 3 and cover 8. A gasket 57, placed between walls 4-7 and cover 8, and a gasket 58 placed between stem 28 and opening 29 seal casing 2. Gasket 58 is resliently flexible so as to allow limited rotatory movements of arm 24.

Wall 6 defines a hole 59, sealed by means of a cap 60 and a gasket 61, through which the seal tight chamber defined by casing 2 can be filled with a viscous fluid, preferably a silicone oil. The viscous fluid has the purpose of damping the movements of arm 24 and also has a lubricating effect that reduces the sliding friction—due to the rotation of arm 24—between the surface of hole 32 and the edges 42 and 43.

An arm 62, clamped to wall 6 by means of screws whose axes 63 and 64 are shown in FIG. 1, connects gauge 1 to a support device 65 that supports gauge 1 and serves to move it towards piece 21 at the beginning of the grinding operation and to retract it when machining ends.

Device 65 includes a plate 66 connected to bed 23 of the grinding machine by means of connection means consisting of a pin 67 whose longitudinal axis is parallel to axis 79 of piece 21. Arm 62 is connected to an end of plate 66 by means of a pin 68 and arm 62 can rotate, with respect to plate 66, about the longitudinal geometrical axis of pin 68, that is parallel to axis 79. The amplitude of the rotations of arm 62 with respect to plate 66 is limited by two limiting devices 69 and 70, fixed to plate 66, that can cooperate with opposite sides of an end 71 of arm 62.

In turn, plate 66, actuated by a control device 72, can rotate, with respect to bed 23, about pin 67. A limiting device 73, clamped to bed 23, limits the clockwise rotations of plate 66. The position of limiting device 73 is adjustable in order to obtain the contacting of feelers 20 and 27 with piece 21 along a diameter of the same piece 21 when the diameter value corresponds to a nominal known value.

Plate 66 supports a steady rest and a relevant actuation device, both not illustrated as they are of a known type. The steady rest, by cooperating with the surface of piece 21 in a position that is diametrically opposite to the contacting position of the grinding wheel 22 with the surface of piece 21, serves to prevent flexure of piece 21 when grinding wheel 22 is pushed against the surface of the piece. In the course of grinding the actuation device of the steady rest displaces the steady rest towards the surface of piece 21 so as to compensate for the reduction in the diameter size that occurs as a consequence of the machining.

The control device 72 includes a rod 74 that can be moved, hydraulically, for example, in the directions 75 shown in FIG. 1. An end 76 of rod 74 cooperates with limit stop surfaces 77 and 78 integral to plate 66, so causing a rotation of plate 66 about pin 67.

At the beginning of a grinding operation on piece 21, control device 72 makes plate 66 rotate in a clockwise direction, moving it from a rest position—not shown—to the position in which plate 66 abuts against limiting device 73.

During a first rotational phase of plate 66 the weight-force moment of gauge 1 and of arm 62, with respect to the longitudinal geometrical axis of pin 68, keeps end 71 of arm 62 in abutment against limit stop 69. Thereafter feeler 20, by touching the surface of piece 21, causes a counterclockwise rotation of arm 62, and of gauge 1 about pin 68. When plate 66 is in contact with limit stop 73, end 71 of arm 61 is in an intermediate position between limiting devices 69 and 70 and gauge 1 is in the gauging position.

When feeler 27 in turn touches the surface of piece 21 it causes a rotation of arm 24 from a rest position, or a position of maximum closure, where section 26 touches limit stop 53.

When gauge 1 is in the gauging position, the contact between feeler 20 and the surface of piece 21 is ensured by the weight force action of the gauge and of arm 62. The weight force is applied in part to piece 21 and in part to pin 68 and is balanced by corresponding reaction. Contact between feeler 27 and the surface of piece 21 is ensured by the action of spring 51.

Spring 39 does not affect in a substantial way the contact force that feeler 27 applies to piece 21 because the distance of the action line of the spring from the axis of rotation of arm 24 can be considered negligible, even if it can have values different from zero. This approximation is justified because the diameter of piece 21, before the grinding operation, differs by a small entity from its nominal value and because in correspondence with the diametrically nominal value the action line of spring 39 passes—as aforementioned—through the axis of rotation of arm 24.

Feeler 20, which is stationary with respect to the outer casing 2 of gauge 1, by touching the surface of piece 21, defines a reference for the dimensional checking of piece 21. The change in the diametrical size of piece 21 in the course of machining causes a clockwise rotation of arm 15, carrying feeler 20, of the outer casing 2 and of arm 62 about pin 68. This rotation is feasible owing to the fact that—as already mentioned—when gauge 1 is in a gauging position, end 71 of arm 62 is in an intermediate position between the two limit stops 69 and 70.

As a consequence of the change in diameter size of piece 21 and of the resilient action of spring 51, the distance separating feeler 27 from feeler 20 varies owing to the rotation of arm 24—with respect to outer casing 2—about the axis defined by the prismatic pin 33 and by hole 32. The rotation of arm 24 causes an axial displacement of feeler 46 of the gauging head 44. Consequently head 44 provides an electrical signal responsive to the deviation of the diameter size of piece 21 from a known nominal value. This signal, by means of cable 47, is sent to the power supply, processing and display unit to be displayed on an indicating instrument and possibly utilized to control the machining cycle of the grinding machine.

Normally control device 72 displaces gauge 1 very rapidly to the gauging position and thus gauge 1 undergoes sudden accelerations and decelerations, and in this phase the gauge is subject to very high dynamic forces.

It will of course be realized that the gauge featured according to the present invention, as a result of the connection of arm 24 to casing 2—by means of pin 33 and bushing 31—, is very sturdy. Moreover, spring 39 allows defining a fixed axis of rotation, for arm 24 and in this way the gauge is also accurate as well as sturdy.

An important feature of gauge 1, that is provided by the action of spring 39, consists in the fact that repeatability is maintained regardless of the wear of pin 33 and of bushing 31. Wear does not affect the univocal definition of the axis of instantaneous relative rotation between pin and bushing—this definition determining the repeatability of the gauge—but causes just a variation in the position of the axis with respect to casing 2. The displacement of the formerly mentioned axis of rotation affects just the gauging accuracy of the gauge. Periodic gauge zero-settings allow for compensation of the influence of wear of pin 33 and of bushing 31. Moreover, it is possible to localize wear in pin 33 by making bushing 31 of a meterial substantially harder than that of pin 33. Gauge 1 can undergo modifications and variations, and according to a first variation one can use a prismatic pin having a cross-section different from the square one.

According to another variation, one can use, instead of the gauging head 44, a position transducer that has a first element, or fixed element, fixed to casing 2 and a second element, or movable element, fixed to section 26 of arm 24.

According to a further variation, pin 33 can be fixed to section 26 and aligned holes can be obtained in wall 3 and in cover 8 and relevant bushings arranged in these holes to enable the rotation of pin 33 and consequently that of arm 24.

It is evident that changes and modifications equivalent from a functional and structural point of view may be made without departing from the scope of this invention.

What is claimed is:

1. A gauge for the dimensional checking of a mechanical piece, comprising an enclosed support, a gauging arm movable with respect to the support, a feeler element connected to the arm to touch the piece to be checked, connection means including a first element fixed to the arm, a second element fixed to the support, and resilient means, the first and the second element allowing limited rotatory gauging displacements of the arm with respect to the support, said resilient means being coupled to the arm and the support for maintaining in firm contact the first and the second elements, in order to define a geometrical axis of rotation for the arm, that is stationary with respect to the support, and detection means associated with the arm and the support, wherein the first element of the connection means defines a portion of a substantially cylindrical surface and the second element includes two edges adapted to remain in contact with two generating lines of the portion of the cylindrical surface, said geometrical axis being defined by the intersection of two geometrical planes passing through said generating lines and being perpendicular to the portion of the cylindrical surface.

2. The gauge according to claim 1, wherein said resilient means include a spring adapted to provide a force with an action line that is substantially incident to said axis of rotation.

3. The gauge according to claim 2, further comprising a viscous fluid placed between said first and second elements within said enclosed support.

4. The gauge according to claim 3, wherein said first connection element is a cylindrical bushing and said second connection element is a prismatic pin.

5. The gauge according to claim 4, wherein said prismatic pin has a cross-section with a square perimeter and chamfers defining said edges.

6. The gauge according to claim 5, wherein the support defines a casing with an internal seal tight chamber, the chamber being filled with said viscous fluid, the movable arm including a section arranged within the casing and carrying said cylindrical bushing, the detection means and the spring being arranged inside the casing and cooperating with said section.

7. The gauge according to claim 6, further comprising a second arm fixed to the casing and arranged outside the casing, and a second feeler fixed to said second arm; the second feeler being adapted to touch the piece in a position opposite to said first feeler, the detection means being adapted to provide a signal responsive to the distance separating the two feelers.

8. The gauge according to claim 7, wherein the action line of said force lies in a geometrical plane passing through said feelers.

9. The gauge according to claim 8, further comprising support elements for supporting the casing, said support elements being adapted to allow approach and retraction movements of the casing and of the arms with respect to the piece.

10. The gauge according to claim 9, for checking a pin of a crankshaft during a grinding operation by a grinding machine, wherein said support elements for supporting the casing are adapted to allow a substantially rotatory movement of the casing and of the arms, the gauge further comprising two limit stops for limiting the amplitude of said substantially rotatory movement.

11. A gauge for the dimensional checking of a mechanical piece, comprising an enclosed support, a gauging arm movable with respect to the support, a feeler element connected to the arm to touch the piece to be checked, connection means including a first element fixed to the arm, a second element fixed to the support, and resilient means, the first and the second elements allowing limited rotatory gauging displacements of the arm with respect to the support, said resilient means being coupled to the arm and the support for maintaining in firm contact the first and the second elements, in order to define a geometrical axis of rotation for the arm, that is stationary with respect to the support, and detection means associated with the arm and the support, wherein one of the elements of the connection means defines a portion of a substantially cylindrical surface and the other element includes two edges adapted to remain in contact with two generating lines of the portion of the cylindrical surface, said geometrical axis being defined by the intersection of two geometrical planes passing through said generating lines and being perpendicular to the portion of the cylindrical surface.

12. The gauge according to claim 11, wherein said resilient means include a spring adapted to provide a force with an action line that is substantially incident to said axis of rotation.

13. The gauge according to claim 12, further comprising a viscous fluid placed between said first and second elements within said enclosed support.

14. The gauge according to claim 13, wherein the element of the connection means defining a portion of a substantially cylindrical surface is constituted substantially by a cylindrical bushing and the other element is a prismatic pin having a cross-section with a square perimeter and chamfers defining said edges.

* * * * *